Nov. 6, 1934.   A. OLSON   1,979,763
BOTTLE TRANSFER APPARATUS
Filed April 21, 1934    4 Sheets-Sheet 4
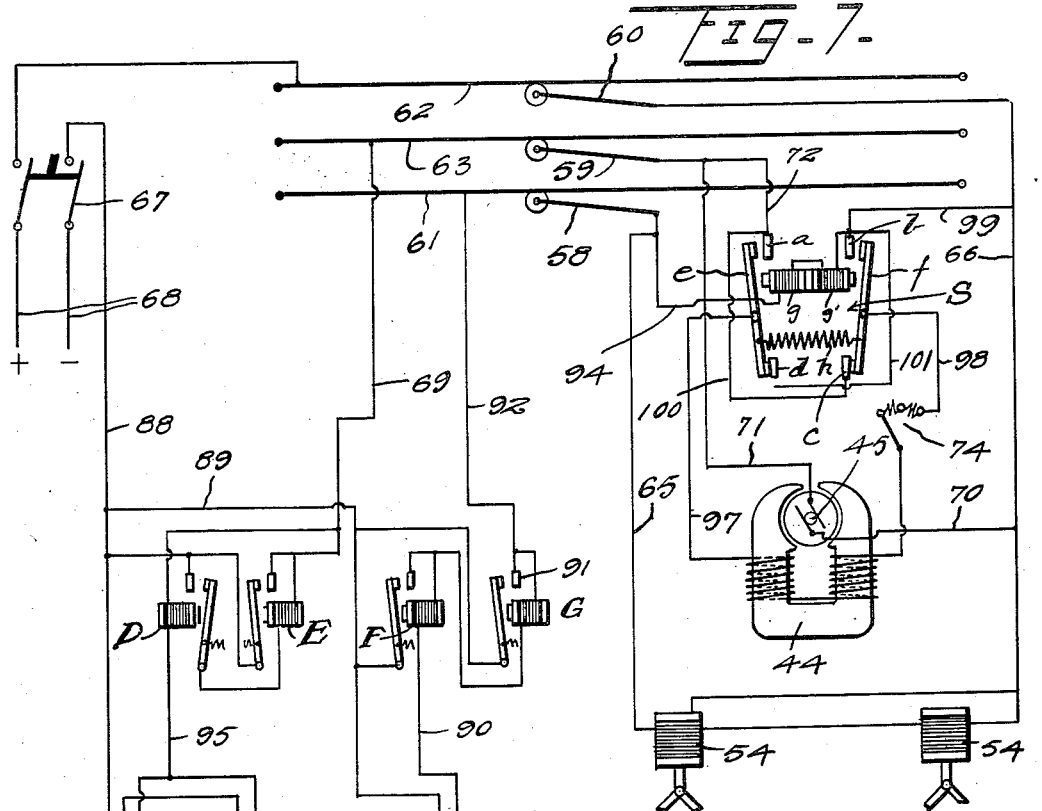
Fig-7.
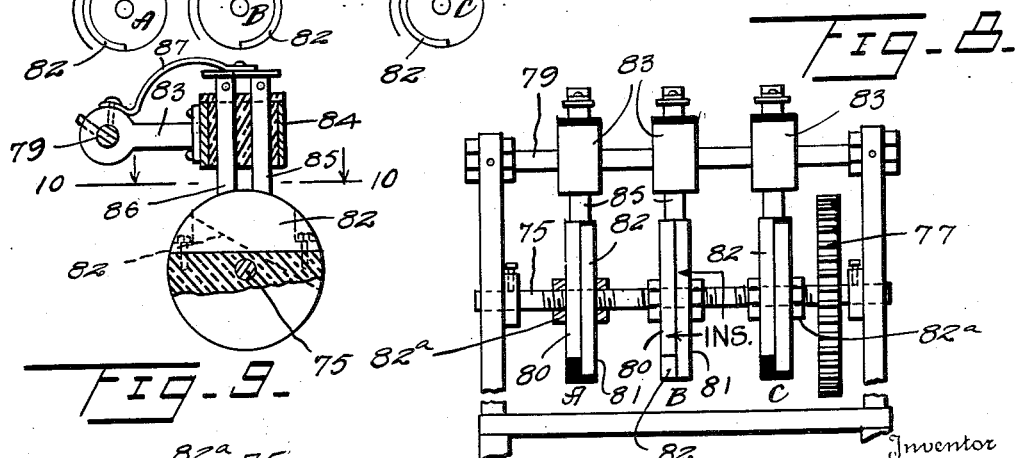
Fig-8.
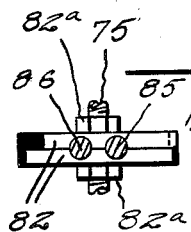
Fig-9.
Fig-10.
Inventor
Andrew Olson
By Watson E. Coleman
Attorney Patented Nov. 6, 1934

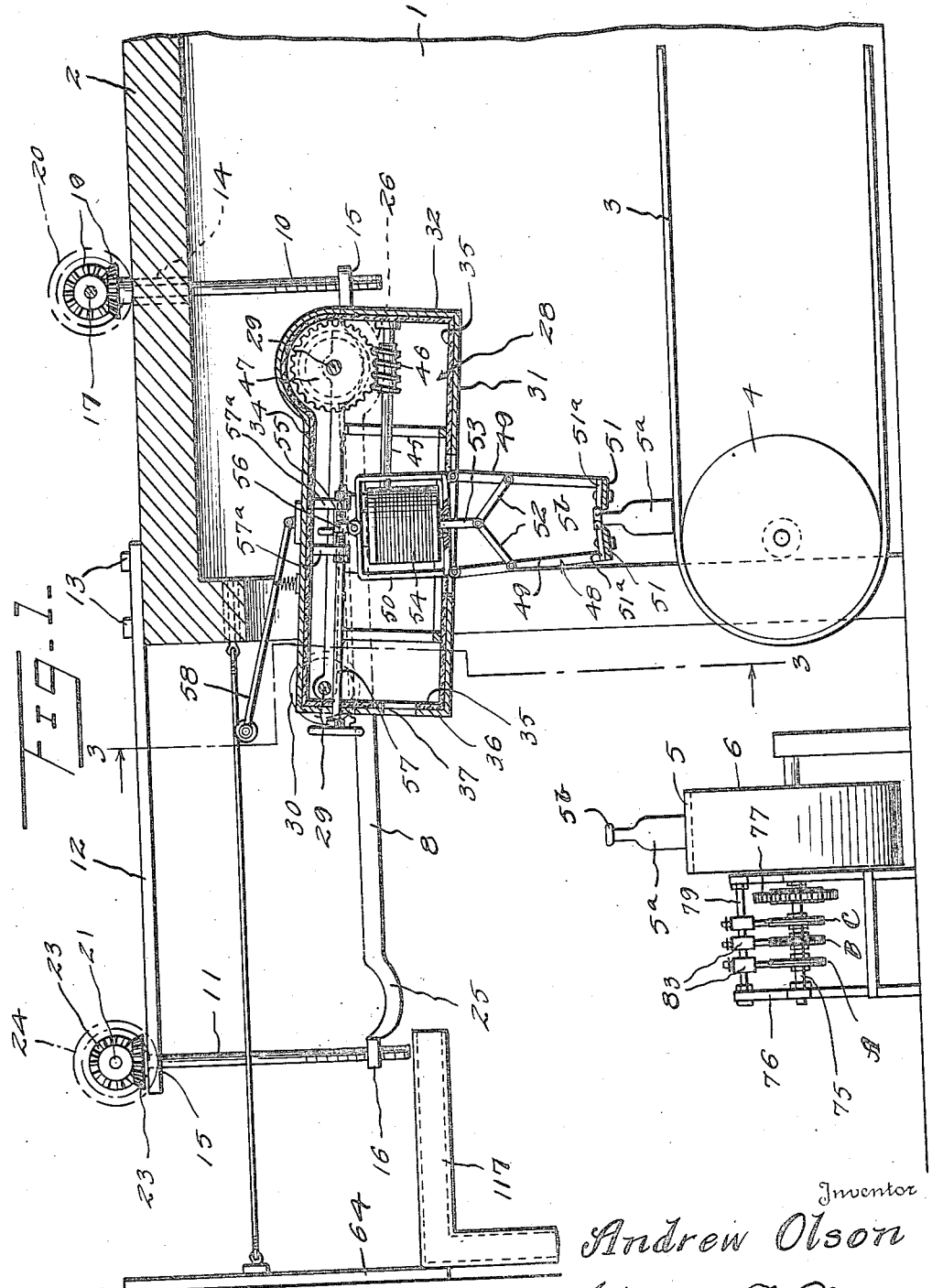

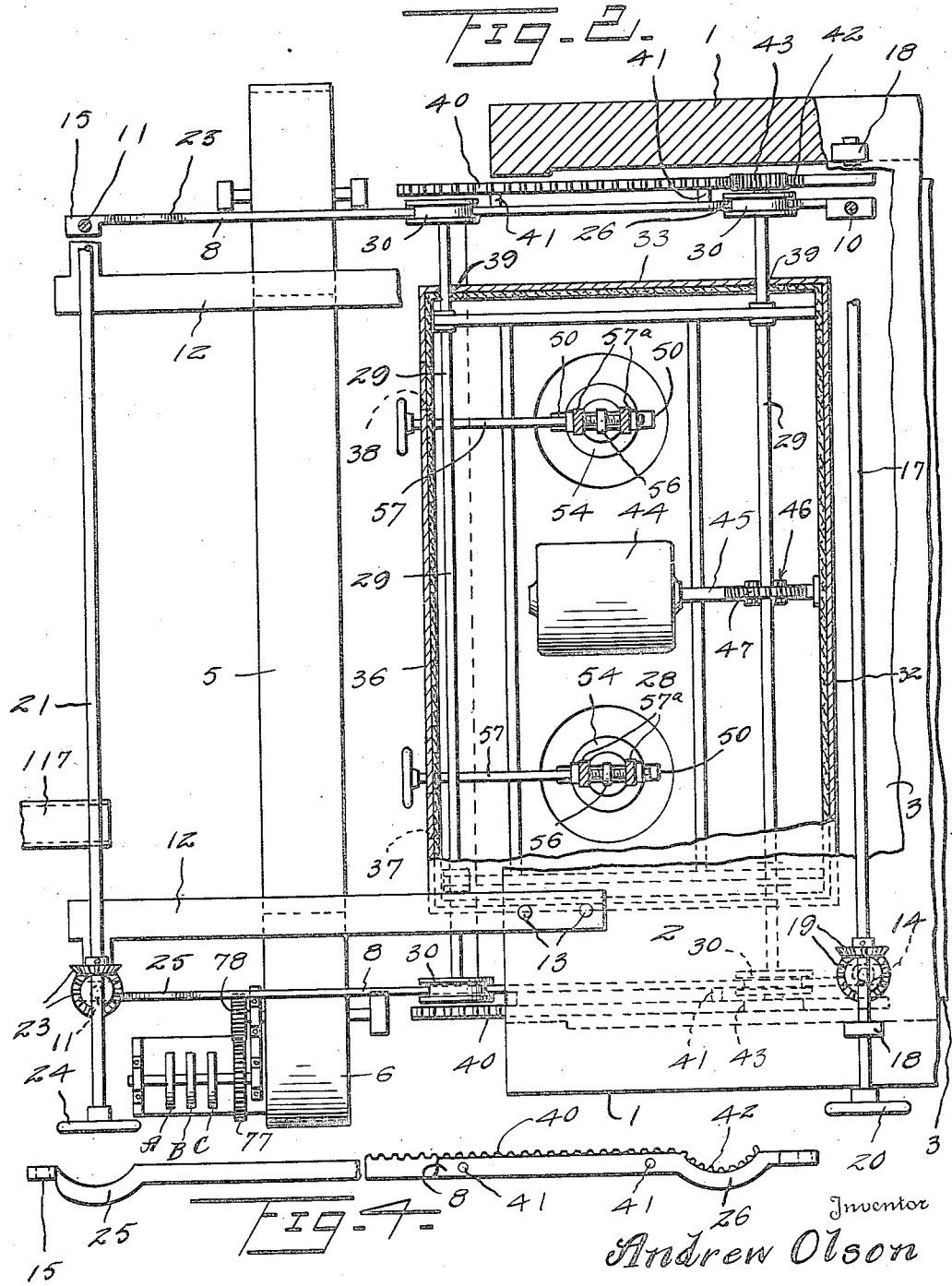

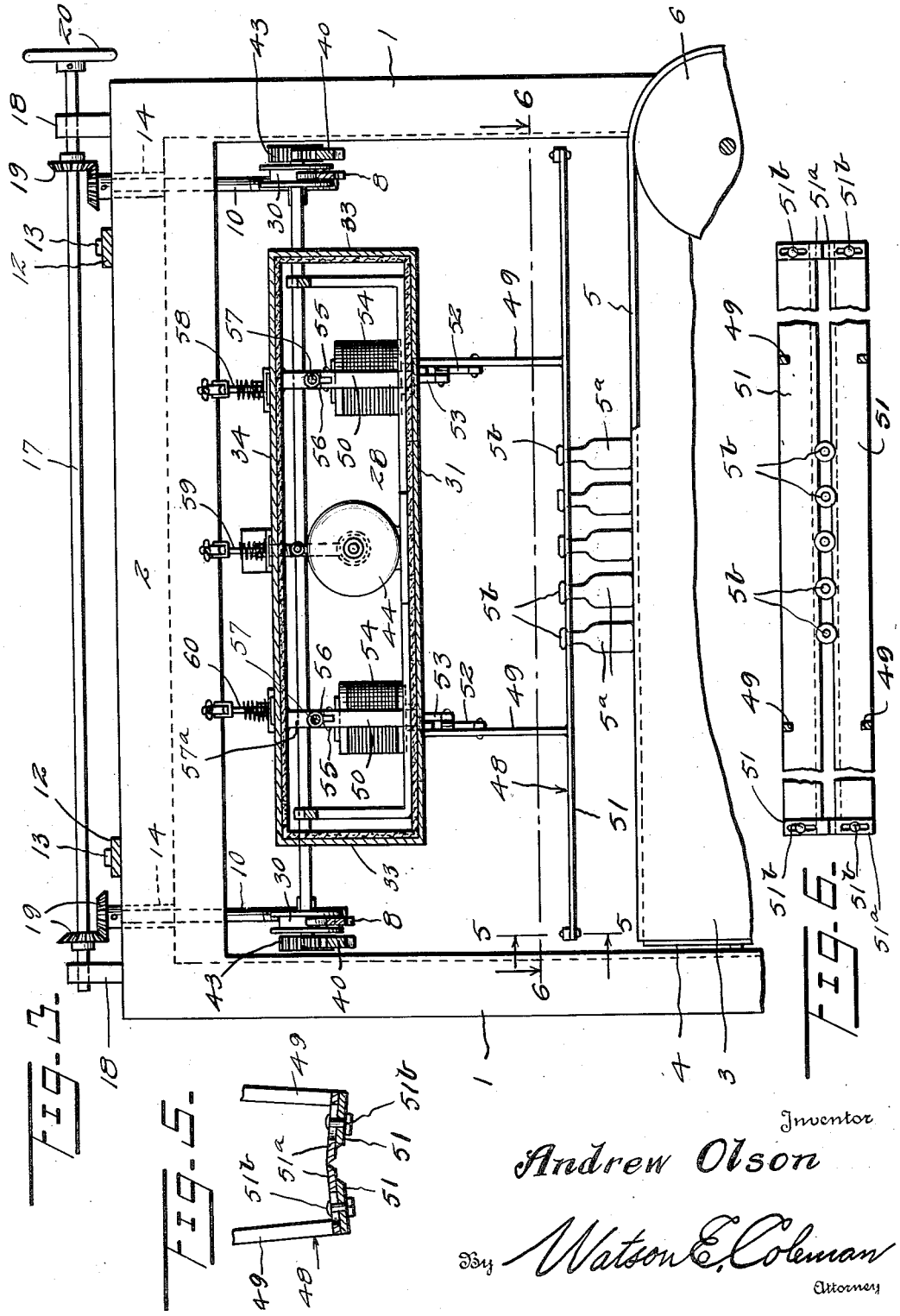

1,979,763

UNITED STATES PATENT OFFICE 1,979,763

BOTTLE TRANSFER APPARATUS

Andrew Olson, Port Allegany, Pa.

Application April 21, 1934, Serial No. 721,803

12 Claims. (Cl. 214—1)

This invention relates to means for transferring bottles from the conveyor of a bottle making machine to the conveyor of a bottle tempering furnace or lehr.

The general object of this invention is to provide a relatively simple but thoroughly effective apparatus for this purpose which shall be adapted to pick a row of bottles up from the conveyor of a bottle making machine, carry these bottles into the tempering furnace and lower the bottles upon the conveyor thereof and release the bottles, the transferring mechanism operating automatically and continuously.

A more specific object of the invention is to provide a bottle transferring apparatus including a carriage moving upon lateral tracks and supporting the bottle gripping mechanism, the tracks being so formed that when the carriage moves to one extreme of its range of movement, one end of the carriage will be lowered to thus lower the gripping mechanism into position to engage the bottles on the conveyor of the bottle making machine, the opposite ends of the tracks being so formed as to permit the forward end of the carriage to be lowered when the carriage is above the conveyor of the bottle tempering furnace to thus permit the bottles supported by the carriage to be lowered on to the conveyor thereof.

A further object in this connection is to so support the bottle gripping mechanism of the carriage that it will swing to a vertical position without regard to the inclination of the carriage and so that it may be slightly adjusted to bring the bottle gripping mechanism into proper relation to the rows of bottles on the bottle machine conveyor and to so form the bottle gripping mechanism that it will affect the transfer of the bottles without any likelihood of pinching or otherwise damaging the necks of the bottles.

A further object is to provide a transfer apparatus of the character stated wherein the carriage shall be moved from a position above one conveyor to a position above the other conveyor by means of a reversible electric motor, the bottle pick-up means being operated to grip and release the bottles by solenoids, the motor controlling mechanism and the solenoids being automatically controlled by switch mechanism operated automatically by the rotation of the shaft carrying one of the pulleys for supporting the conveyor of the bottle making machine.

Other objects have to do with the details of the electrical control system as will appear more fully hereinafter.

My invention is illustrated in the accompanying drawings, wherein:—

Figure 1 is a longitudinal section through a lehr and through the carriage of my transfer mechanism, the conveyors being shown in elevation;

Figure 2 is a top plan view, the top of the lehr being partly broken away and the carriage being in section;

Figure 3 is a section on the line 3—3 of Figure 1;

Figure 4 is an elevation of one of the rails and showing the associated rack bar;

Figure 5 is a section on the line 5—5 of Figure 3;

Figure 6 is a section on the line 6—6 of Figure 3;

Figure 7 is a diagram of the electrical connections;

Figure 8 is an elevation of the controlling disks and the mounting therefor;

Figure 9 is an elevation partly broken away of one of the controlling disks and its brushes, and Figure 10 is a section on the line 10—10 of Figure 9.

In these drawings, 1 designates the side walls and 2 the top wall of a bottle tempering furnace or lehr and 3 designates the lehr conveyor of such a furnace. The conveyor 3 may be of any suitable character but is shown as an endless belt conveyor extending longitudinally of the furnace and supported by drums or pulleys, one of these drums being illustrated and designated 4.

Disposed in front of the opening of the bottle tempering furnace is a conveyor 5 adapted to receive bottles from a bottle making machine, this conveyor extending parallel to the front of the furnace and being supported by pulleys or drums, one of which is shown and designated 6, the other pulley not being shown. The purpose of my apparatus is to transfer a plurality of bottles 5ª arranged in a single line upon the conveyor 5 from the conveyor 5 into the furnace 1 and deposit these bottles upon the conveyor 3. To this end, I provide laterally disposed horizontal rails 8 arranged above the conveyors 3 and 5, these rails extending parallel to the conveyor 3 and at right angles to the conveyor 5. The rails 8 are suspended at their inner ends from the top wall 2 of the furnace by screws 10 while the outer ends of the rails are supported by screws 11 from brackets 12 secured to the top wall of the furnace by bolts 13. The screws 10 are journaled in the top wall of the furnace while screws 11 are journaled in the bracket arms 12 as at 14 and 15 respectively. A shaft 17 journaled in bearings 18 is engaged with the screws 10 by beveled gears 19 and is operated by a hand wheel 20. A like shaft 21 is journaled in bearings carried by the bracket arms 12 and carries beveled gear wheels 23 which engage with the beveled gear wheels on the screws 11. This shaft 21 is also provided with the hand wheel 24. Thus it will be seen that either the forward or rear ends of the rails may be raised or lowered so as to secure a proper adjustment of the rails, not only as regards horizontality, but to raise or lower the rails with relation to the conveyors 3 and 5 so as to make the device capable of handling either relatively tall bottles or relatively short bottles and bringing the gripping means of the carriage into proper relation to the necks of the bottles.

The rails 8 are formed at their outer ends with arcuate depressions or seats 25 and at their inner ends with arcuate depressions or seats 26.

Operating on these rails is a carriage 28 which is supported by shafts 29 carrying flange wheels 30 which engage the rails 8. The carriage is in the form of a closed casing and its bottom wall 31, rear wall 32, side walls 33 and top wall 34 are imperforate and lined with heat-insulating material designated 35 to protect the parts within the casing from the heat of the bottle making machine and the bottle tempering furnace. Front wall 36 of the carriage is also lined with insulating material but is provided with an air inlet port 37 and an air outlet port 38 (see Figure 2) to permit air to be circulated through the carriage for the purpose of keeping the mechanism therein cool. The side walls 33 are provided with openings 39 for the passage of the shafts 29.

The front wheels 30 are so spaced from the rear wheels 30 that when one of these pairs of wheels is disposed in the depressions 25, the other pair of wheels will be disposed at the middle of the tracks and when the forward pair of wheels 30 is engaged in the depression 26, the other pair of wheels will be disposed at the middle of the tracks.

For the purpose of moving the carriage 28 from one of these positions to the other, I provide exteriorly of the rails 8, the rack bars 40 which are parallel to the rails 8, each rack bar extending from the middle of one of the rails 8 to the seat 26 thereof. The rack bars 40 are secured to but spaced from the rails 8 by webs 41. Each rack bar is provided at its rear end with downwardly curved terminal toothed portion 42 which is arranged in coincidence with the seat 26.

Pinions 43 are attached to the rear shaft 29 and mesh with the rack bars 40. An electric motor 44 which is reversible is mounted within the carriage 28 and the armature shaft 45 thereof carries a worm 46 meshing with the worm gear 47 on the shaft 29. It will be seen that when the motor is operated in one direction, the carriage will be moved toward the left in Figure 1 and when the motor is operated in the reverse direction, the carriage will be moved toward the right. Assuming that the carriage is moving from the position shown in Figure 1 to a position over the conveyor 5, then when the motor is started, the rear end of the carriage will rise out of the depression 26, thus lifting the rear end of the carriage and lifting the bottle gripping mechanism and that when the carriage reaches its position over the conveyor 5, the forward end of the carriage will drop due to the forward wheels of the carriage moving into the depressions 25, thus lowering the gripping mechanism into position to engage a row of bottles on the conveyor 5. The degree of raising or lowering movement will, of course, depend upon the depth of the downwardly curved seats 25 and 26. This depth will be just sufficient to cause the gripping mechanism to lift the bottles clear of the conveyor 5 and deposit the bottles upon the conveyor 3.

The carriage is provided with bottle gripping means designated generally 48 which includes levers 49 pivoted to a swinging yoke 50 and clamping jaws 51 fixed to the lower ends of the levers.

There are two sets of these levers 49 disposed adjacent the ends of the carriage. It will be noted from Figure 5 that the gripping jaws extend upward and inward from the lower ends of the levers 49 and are thus adapted to engage with the under sides of the beads $5^b$ and on opposite sides of the bottle necks. Each pair of levers 49 is pivoted to toggle links 52, the inner ends of these links being connected to the cores 53 of a pair of solenoids 54. Each solenoid is supported in the yoke 50 previously referred to, this yoke being disposed in an opening formed through the bottom wall of the carriage. Each yoke is pivoted at 55 to a nut 56 engaged by a longitudinally extending screw 57 mounted in suitable bearings $57^a$ depending from the top of the carriage, the screw 57 extending through the forward end of the carriage and being provided with a hand wheel. This construction permits the solenoids and the bottle gripping jaws to be always disposed in a vertical plane without regard to the tilting of the carriage. The screws 57 provide means whereby to shift the position of the picking up mechanism so as to compensate for different diameters of bottles.

It will be seen that when the solenoids 54 are deenergized, the jaws 51 will swing to an open position so that the jaws may be lowered on each side of the row of bottles just below the beads $5^b$ thereof and that then when the solenoids are energized, the core 53 and the links 52 will draw the jaws inward against the necks of the row of bottles below the beads $5^b$ thereof and that when the carriage is raised at one end, the bottles will be lifted, as for instance, from the conveyor 5 and, when the carriage has reached its position over the conveyor 3, the carriage will be lowered at one end, thus lowering the bottles upon the conveyor 3, the solenoids being then deenergized to release the bottles.

To prevent the jaws from pinching the necks of the bottles, stops $51^a$ are secured to the ends of the jaws and extend inwardly beyond the inner edges of the jaws. These stops engage each other when the jaws are in a bottle-neck engaging relation and these stops, as shown in Figure 6 are adjustable transversely of the jaws to thus permit the jaws to engage bottle necks of different diameters. To this end, the stops are longitudinally slotted at $51^b$ and screws or pins pass through these slots into the ends of the jaws.

When the jaws are engaged with the bottle necks on the conveyor 5, the motor 44 is energized to cause its armature to turn in a direction to move the carriage from its position over the conveyor 5 to a position over the conveyor 3. When the carriage 28 reaches its position above the conveyor 3, the motor 44 is deenergized and the bottles are lowered into contact with the conveyor 3, as before described. After the jaws have released the bottles, the motor is again energized but in an opposite direction to cause the carriage 28 to return to its position above the conveyor 5.

The motor 44 as shown diagrammatically in Figure 7 has its field coils and its armature brushes connected, as will be described later, to a source of current and to certain controlling switches by trolleys 59 and 60. The solenoids receive current from a trolley 58. The trolleys 58, 59 and 60 operate over trolley rails or wires 61, 62 and 63 respectively which are supported at one end by a panel 64 and at the other end by the wall of the lehr. The solenoids 54 are connected in parallel by a conductor 65 to the trolley 58 which receives current from the wire or rail 61.

A return conductor 66 leads to the trolley 60 which engages the rail or trolley wire 62. The trolley wire 62 is connected to one terminal of a switch 67 connected by the line wires 68 leading from a source of current. The switch is shown as a double pole switch of ordinary construction. The trolley wire 62 is connected to the other terminal of the switch 67. Trolley wire 63 is connected through the conductor 69 and through intermediate switches and relays to the switch 67.

The armature circuit of motor 45 includes a conductor 70 connected to the conductor 66 and a conductor 71 connected to the conductor 72 leading to the trolley 59. Thus current passes from the wire 63 to the wires 72 and 71 through the armature coils in one direction and by return wires 70 and 66 to the return trolley wire 62 back to the source of current. Thus current passes always in one direction through the armature circuit of the motor.

The field coils of the motor are connected on both sides to a reversible switch designated generally S of ordinary and usual construction and shown diagrammatically in Figure 7. This switch has the usual four contacts a, b, c and d, the pivoted switch arms e and f and the magnets g and g'. The conductor 72 is connected to the contact a which in turn is connected to the diagonally opposite contact c. The contact b is electrically connected to the return wire 66 and electrically connected to the diagonally opposite contact d. The switch arm e is electrically connected to the switch arm f and to the field coils of the motor by a conductor 97, the current passing to the field coils being controlled by an adjustable rheostat 74. For switching the switch arms e and f, the magnets g and g' are provided as usual connected in series. A spring h normally holds the switch arms in the position shown in Figure 7 when the magnets g and g' are not energized. The magnets g and g' are connected on one side to the feed wire 65 and on the other side to the return wire 66.

For the purpose of controlling the passage of current through the circuit of the solenoids 54 and through the motor circuits, I provide a shaft 75 mounted in brackets or standards 76. One end of the shaft carries on it the gear wheel 77 which may be driven by a gear wheel 78 carried on the shaft or pulley 6. These standards also carry a brush supporting bar 79. Mounted on the shaft 75 are three circular controlling disks A, B and C. Each disk is formed of two parallel closely adjacent sections 80 and 81 of fibre or other insulating material, each section carrying a brass segment 82. The two fibre sections with their segments together constitute one disk and are held in engagement with each other and in properly adjusted position on the shaft 78 by nuts 82ᵉ. By loosening these nuts, the separate sections may be adjusted circumferentially with respect to each other and thus the two segments may be brought in direct registration with each other or into a more or less overlapping position, that is, a position only partially registering with each other, which position is shown in the drawings. When the two sections are in complete registration with each other, the segment is relatively short but as they are moved into less and less overlapping position, each segment is made longer in effect. Thus the effective or total length of the metal contact formed by the two segments 82 may be increased or decreased.

Mounted on bar 79 are a plurality of brush holders, one for each of the disks A, B and C and designated 83, each carrying at its end a fibre block 84 having two apertures for the reception of brushes 85 and 86, both of these brushes engaging both of the sections 80 and 81 of a disk, as shown in Figure 10. So long as both of the brushes are in contact with either of the metallic segments 82, current will pass between the two brushes. As soon as either one of the brushes, however, runs off of a metallic segment 82, current will cease to pass between the two brushes. Thus the length of time during which current will pass through the two brushes will depend upon the total length of the more or less overlapping segments 82. The brushes are held against the segments by a spring 87.

Of course, the two sections 80 and 81 with their segments constitute one controlling disk and it will be seen that the only reason I have provided two sections for each disk is to provide a ready means for increasing or decreasing the effective length of the metallic contact with which the brushes engage so that proper adjustment and timing may be readily secured.

The particular construction described is true for each controlling disk A, B and C. The segment 82 of disk A is shown in Figure 7 as extending approximately through an arc of 180° and as being opposed to the segment 82 of the disk B, this segment 82 extending through an arc of approximately 180°. The segment 82 of disk C extends through an arc of slightly more than 180° and is disposed approximately coincident with the position of the segment 82 of disk A.

The brushes of disk A are connected to one side of the switch 67 by means of the feed wire 88 which supplies current in a manner to be hereafter stated to the motor and which also supplies current to the solenoids 54 by way of the wire 89.

As shown in Figure 7, the brushes of the disks A and B are associated with one or two relays designated D and E and the brushes of the disk C are also associated with either one or two relays F and G, it being understood that while I have illustrated two relays in the motor and solenoid circuits, yet one relay in each of these circuits may be used in place of the two relays, the two relays being used in order to prevent arcing.

Assuming that the carriage is disposed above the conveyor 5, that the forward end of the carriage is depressed by reason of the wheels thereof being located in the depressions 25 and that the jaws 51 are disposed on each side of a row of bottles 5ª, then the operation is as follows:

An instant before the circuit through the motor is closed by the disk A, the circuit is closed through the solenoids 54 and through the magnets of the reversing switch S. When disk C closes circuit through its brushes, current flows to the magnet of relay F by wires 88 and 89 and wire 90. This closes the armature of relay F and current from wire 89 is conducted to the magnet of relay G. Its armature is closed which carries current directly to contact 91 and by wire 92 to the trolley wire 61, thence by trolley 58 to wire 65 to the solenoids 54 and back by return wire 66, trolley 60 and cable 62 to switch 67, thus causing the jaws 51 to close on the bottles. At the same time, current passes from trolley 58 by wire 94 to the two magnets $g$, $g'$ of the reversing switch S. This causes the arms $e$ and $f$ to leave contacts $c$ and $d$ and engage contacts $a$ and $b$.

As the switch is reversed from the position shown in Figure 7, disk A closes a circuit from wire 88 through the brushes of disk A through wire 95 to and through the magnet of relay D, the armature of which relay closes a circuit directly from the feed wire 88 through the magnet of relay E. The armature of this relay then connects the feed wire 88 directly by wire 69 to the trolley wire 63, thence through trolley 59 and wire 72 to contact $a$, thence to the switch arm $e$, thence by wire 97 to and through the field coils of the motor, thence through the rheostat 74 by wire 98 to switch arm $f$, thence to contact $b$, thence to the return wire 66 by wire 99 and back through trolley 60 and cable 62 to the switch 67, thus completing the circuit in one direction through the field coils of the motor. At the same time, the circuit is completed through the armature coils by the wires 70 and 71. It will be understood, of course, that the current is reversed through the field coils of the motor but not through the armature coils.

Immediately after the jaws have closed on the bottles and the motor is energized, the gear wheels 43 engaging the racks 40 carry the carriage into the lehr. The current is cut off by disk A just before the wheels 30 reach the depression 26 of the rails and the impetus of the carriage carries the carriage into the lehr until its wheels are dropped into the depression 26, lowering the bottles upon the conveyor 3. An instant later, the disk C has turned so far that electrical connection between the brushes of the disk is broken, opening the circuit through the solenoids. The jaws 51 open depositing the bottles upon the conveyor 3. Inasmuch as the disk C has turned so far that electrical connection between the brushes of this disk have been broken, the spring $h$ of the reversing switch throws the switch arms $e$ and $f$ to the position shown in Figure 7. Immediately thereafter the disk B closes a circuit through its brushes from the feed wire 88 through the relays D and E as before stated, through the wire 96 to wire 63, trolley 59 and by wire 72 to the contact $a$, thence by wire 100 to contact $c$ of the reversing switch, thence by arm $f$ to wire 98, thence in the reverse direction through the coils of the motor and by wire 97 to the switch arm $e$, thence to contact $d$, thence by wire 101 to contact $b$ and thence by wire 102 to the return wire 66, thus reversing the direction of movement of the current through the field coils and causing the motor to rotate in a direction to carry the carriage out of the lehr with the jaws 51 open, of course. The carriage moves out of the lehr until the front wheels of the carriage drop into the depressed portion 25 of the rails, the segment 82 cutting off current just before the front wheels reach this depressed portion. The carriage, therefore, again comes to a standstill with the jaws 51 open and disposed on each side of a row of bottles carried by the conveyor 5, which completes the cycle of operation.

When the carriage reaches a position over the conveyor 5, the opening 37 is immediately opposite the air pipe 117 and cool air is blown into the interior of the carriage and out through the opening 38, thus cooling the interior of the carriage and the parts carried thereby.

As before remarked, I do not wish to be limited to the use of two relays in the motor circuit or two relays in the solenoid circuit as this number of relays is purely illustrative of my invention and this number may be changed according to requirements. The wiring for these relays has not been specifically described for the reason that this wiring will be evident to anyone skilled in the art. I have shown on the drawings a shunt field motor but this is purely illustrative as any suitable reversible motor may be used.

It will be seen that the segments 82 of the disks A, B and C may be adjusted to secure any coincident or successive action of these controlling disks enclosing the several circuits described.

It will be seen that the construction may be readily timed in proper relation to the conveyors 5 and 3.

It should be apparent from the foregoing description, taken in connection with the accompanying drawings, that I have provided an apparatus which functions to automatically transfer bottles from the conveyor of a bottle making machine to the conveyor of a bottle tempering furnace, that during each operation of the apparatus, the entire complement of bottles, equivalent to the width of the tempering furnace, on the bottle making machine conveyor are transferred to the tempering furnace conveyor, and that the apparatus is adapted to effect the transfer of the bottles without upsetting the bottles upon the bottle making machine conveyor and without upsetting the bottles deposited upon the furnace conveyor.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. An apparatus for transferring articles from one conveyor to another, comprising a carriage, means supporting the carriage for movement from a position above one of the conveyors to a position above the other and the supporting means being formed to effect a bodily downward movement of the carriage when in either of said positions, means for moving the carriage from one of its positions to the other, article gripping means mounted on the carriage, and means for operating said gripping means to effect the engagement of the articles when the carriage is in one of its positions and to effect the release of the articles when the carriage is in the other of its positions.

2. An apparatus for transferring articles from one conveyor to another, comprising a carriage, rails mounted above the conveyors and provided at their ends with arcuate depressions, wheels journaled on the carriage and mounted upon the rails to support the carriage for movement from a position above one of the conveyors to a position above the other, the wheels moving downwardly onto the depressions when the carriage reaches either one of its positions, means for moving the carriage from one of its positions to the other, article gripping means mounted on the carriage, and means for operating said gripping means to effect the engagement of the articles when the carriage is in one of its positions and to effect the release of the articles when the carriage is in the other of its positions.

3. An apparatus for transferring articles from one conveyor to another, comprising a carriage, rails mounted above the conveyors and provided at their ends with arcuate depressions or seats, wheels journaled in the carriage and mounted upon the rails to support the carriage for movement from a position above one of the conveyors to a position above the other, the wheels moving downwardly into the depressions when the carriage reaches either one of its positions, means for supporting the rails for adjustment toward and away from the conveyors, means for moving the carriage from one of its positions to the other, article gripping means mounted on the carriage, and means for operating said gripping means to effect the engagement of the articles when the carriage is in one of its positions and to effect the release of the articles when the carriage is in the other of its positions.

4. An apparatus for transferring articles from one conveyor to another, comprising a carriage, rails mounted above the conveyors and provided at their ends with arcuate depressions, wheels journaled on the carriage and mounted upon the rails to support the carriage for movement from a position above one of the conveyors to a position above the other, the wheels moving downwardly into the depressions when the carriage reaches either one of its positions, rack bars carried by the rails and having each an arcuate depression alined with one of the terminal rail depressions, pinions, journaled in the carriage and meshing with the rack bars, means for operating the pinions to effect the movement of the carriage from one of its positions to the other, article gripping means mounted on the carriage, and means for operating said gripping means to effect the engagement of the articles when the carriage is in one of its positions and to effect the release of the articles when the carriage is in the other of its positions.

5. An apparatus for transferring articles from one position to another including a carriage, rails for supporting the carriage for movement frm one position to the other, said rails permitting the carriage to lower when it reaches either of its positions, article grippers depending from the carriage, means for automatically operating said grippers to engage the article when the carriage is in one position and lowered, and automatically releasing said gripping means when the carriage is in its other position and lowered, a reversible electric motor mounted on the carriage for operating said carriage, and constantly operated controlling means for supplying current to the motor and reversing the motor at the ends of the travel of the carriage.

6. An apparatus for transferring articles from one position to another including a carriage, a rail for supporting the carriage for movement from one position to the other, said rail being formed to permit the carriage to bodily lower when it reaches either of its positions, article grippers depending from the carriage, solenoids mounted in the carriage and associated with said grippers and when energized closing the grippers, but when deenergized permitting them to open, a reversible electric motor on the carriage for operating said carriage on said rail, constantly operated means for energizing said solenoids to cause the closing of the grippers when the carriage is in one position and lowered and deenergize the solenoids when the carriage is in its other position and lowered, and constantly operated means for controlling the supply of current to the motor and reversing the motor at the ends of the travel of the carriage.

7. An apparatus for transferring articles from one conveyor to another, comprising an enclosed carriage having an air inlet port and an air outlet port on one side thereof, means supporting the carriage for movement from a position above one of the conveyors to a position above the other, means for moving the carriage from one of its positions to the other, an electric motor for operating said second means, article gripping means mounted on the carriage, electrical means for operating said gripping means to effect the engagement of the articles when the carriage is in one position and to effect the release of the articles when the carriage is in the other position, a switch in circuit with said motor and electrical means, and an air supply pipe adapted to register with the air inlet port of the carriage when the carriage is in the other of its positions.

8. The combination with two conveyors, of means for transferring articles from one conveyor to the other including a carriage, rails supporting the carriage for movement from one position to the other, said rails having depressed portions at their ends whereby the carriage may lower automatically when it reaches either of its positions, article gripping jaws depending from the carriage, means for causing the closing or opening of said jaws including solenoids operatively connected to the jaws and when energized closing them and when deenergized permitting the jaws to open, a reversible electric motor mounted on the carriage, racks extending parallel to the rails, each rack having a depressed portion coincident with a corresponding depressed portion on the rail and extending from said depressed portion towards the middle of the rail, gear wheels engaging said racks and driven by said motor, means operated by one of said conveyors controlling the supply of electric current to the motor and cutting off the current just before the carriage reaches one of its terminal positions and after a predetermined time supplying current to the motor, and means operated by the conveyor for automatically reversing the current through the motor when the carriage has reached a terminal position, said means operating to energize the gripper solenoids when the carriage is in one of its terminal positions to cause them to close upon the article and deenergize said solenoids when the carriage has reached the other of its terminal positions to thereby deposit the article and retain said solenoid in its deenergized position until the carriage has returned to its receiving position and lowered.

9. An apparatus for transferring articles from one position to another including a carriage, rails for supporting the carriage for movement from one position to the other, the rails at their extremities having depressed portions, forward and rear wheels supporting the carriage and running upon said rails whereby the forward or rear end of the carriage will be lowered when the forward or rear wheels reach said depressions, article gripping means depending from the carriage, means for automatically closing said gripping means when the carriage has reached one of its terminal positions and been tilted downward, means for automatically opening said article gripping means when the carriage reaches the other of its terminal positions and been tilted downward, an electric motor for the carriage, and constantly operated controlling means for supplying current to the motor to cause it to move from a receiving position to a delivery position, cutting off the supply of current to the motor when the carriage reaches its delivery position, supplying current to the motor in a reverse direction to cause the return of the carriage, and cutting off the supply of current to the motor just before the carriage reaches its initial terminal position.

10. An apparatus for transferring articles from one position to another including a carriage, means for supporting the carriage for movement from one position to the other, said means permitting the carriage to lower when it reaches either of its positions, an electric motor for the carriage, and means for controlling the passage of electric current to the carriage including a shaft, a disk mounted on the shaft, the disk consisting of two parallel abutted sections of insulation, each section being adjustable around the shaft relative to the other section, each section having set therein a metallic segment adapted to overlap to a greater or less extent the metallic segment of the other section, means for holding the sections in circumferential adjusted position on the shaft, and a pair of brushes both engaging the periphery of the disk and both engaging both of said segments.

11. The combination with two conveyors, of means for transmitting articles from one conveyor to the other including a carriage, rails for supporting the carriage for movement from one position to the other, said rails having depressed portions, wheels mounted on the carriage and supporting the carriage on said rails and adapted to ride into said depressed portions to thereby cause the carriage to lower when the carriage reaches a position over one or the other of the conveyors, article grippers depending from the carriage and normally in open position, solenoids associated with the grippers and when energized causing the grippers to close on an article, a motor for the carriage, means driven by the motor for shifting the carriage from one end of the rails to the other, the motor having an armature and field coils, a reversing switch associated with the field coils of the motor, a pair of disks driven by one of said conveyors and acting to alternately supply current to the motor and cut off the supply of current before the carriage reaches either of its terminal positions, a controlling disk operated in time with the first named disks and acting to supply current to the solenoids when the carriage is in its article receiving position and until the carriage has reached its article delivery position and has lowered, said last named controlling disk operating said reversing switch to cause the current to pass alternately in one direction or the other through the motor.

12. The combination with two conveyors, of means for transmitting articles from one conveyor to the other including a carriage, rails for supporting the carriage for movement from one position to the other, said rails having depressed portions, wheels mounted on the carriage and supporting the carriage on said rails and adapted to ride into said depressed portions to thereby cause the carriage to lower when the carriage reaches a position over one or the other of the conveyors, article grippers depending from the carriage and normally in open position, solenoids associated with the grippers and when energized causing the grippers to close on an article, a motor for the carriage, means driven by the motor for shifting the carriage from one end of the rails to the other, the motor having an armature and field coils, a reversing switch associated with the field coils of the motor, a pair of disks driven by one of said conveyors and acting to alternately supply current to the motor and cut off the supply of current before the carriage reaches either of its terminal positions, a controlling disk operated in time with the first named disks and acting to supply current to the solenoids when the carriage is in its article receiving position and until the carriage has reached its article delivery position and has lowered, said last named controlling disk operating said reversing switch to cause the current to pass alternately in one direction or the other through the motor, and a rheostat disposed in the field circuit of said motor whereby to adjust its speed.

ANDREW OLSON.